(No Model.)

G. H. HOOD.
TRUCK WHEEL.

No. 245,827.   Patented Aug. 16, 1881.

Witnesses.
E. A. Phelps.
C. G. Keyes.

Inventor.
Geo. H. Hood
by his attorney
A. H. Spencer

UNITED STATES PATENT OFFICE.

GEORGE H. HOOD, OF CHELSEA, MASSACHUSETTS.

TRUCK-WHEEL.

SPECIFICATION forming part of Letters Patent No. 245,827, dated August 16, 1881.

Application filed November 20, 1880. (No model.)

*To all whom it may concern:*

Be it known that I, GEORGE H. HOOD, a citizen of the United States, residing at Chelsea, in the county of Suffolk and State of Massachusetts, have invented certain new and useful Improvements in Noiseless Truck-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide an improved truck-wheel having a durable and somewhat elastic tire, rendering it noiseless, and otherwise so constructed as to be permanently useful even after such tire is worn away. To this end I give to the metallic wheel a clean and smooth cylindrical periphery, and I apply thereon a thin tire of uniform thickness and homogeneous character composed of a vulcanizable rubber compound, and then secure such tire in position upon the wheel by vulcanization.

My invention is embodied in the new article of manufacture thus produced, and is practiced in the process of forming such wheel, as hereinafter set forth.

I am aware that it is not broadly new to unite rubber to metals by vulcanization.

The British patent to Offord, No. 2,932 of 1860, describes wheel-tires (not homogeneous) made of an inner layer of hard rubber or vulcanite, to take firm hold of the metal surface, and an outer elastic surface vulcanized to the hard rubber.

I am also aware that vulcanized rubber tires have been placed upon wheels and held in position by constriction and cement, and that elastic tires have been held in place by edge-flanges on the wheels or by some other mechanical contrivance.

My improved wheel is superior to any heretofore produced in permanence of union of the rubber and metal, in utilization of every particle of material employed, in economy of construction, due to the limited thickness and homogeneous nature of the rubber and the absence of any bolts or other mechanical fastenings therefor, and in the fact that, being smooth and without flanges, the wheels will not mar the floor after the rubber is all worn off.

Figure 1:
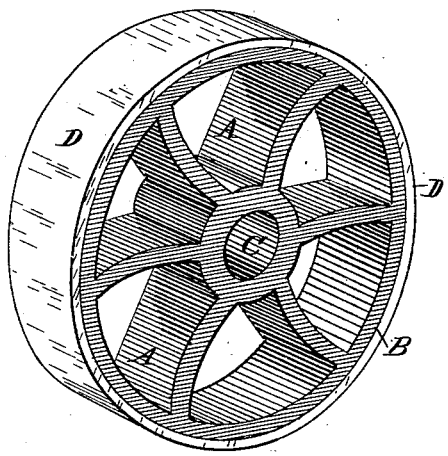
Figure 2:
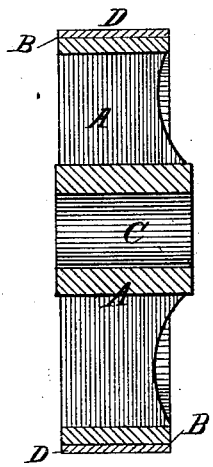

In the drawings, Figure 1 represents my invention in perspective, and Fig. 2 in central section.

A is the metallic wheel, usually of cast-iron, of any desired dimensions, having a smooth and perfectly cylindrical periphery, B, and a central bearing, C.

D is the elastic band or tire, of uniform thickness and density from edge to edge and in every part, and of the same width as the part B of the wheel, to which it is permanently united in the process of vulcanization.

In the manufacture of my improved wheels I first cast the metallic part A B, then carefully center it and drill the bearing C; then place the wheel upon a suitable rotary arbor and buff its face or grind it by means of an emery-wheel until a clean and smooth cylindrical surface is obtained that will not mar the floor under a heavy weight. The wheel is now prepared for the application of the vulcanizable compound, either by the means described in the patent to Isaac Adams, Jr., May 6, 1879, or by any other known method adapted to make the rubber adhere tenaciously to the metal when vulcanized thereon. During the process of vulcanization the wheel and tire are held in a mold or wrapped in a cloth, as is well understood, and afterward the rubber should be finished by buffing, so as to give as smooth and uniform a surface as possible.

It is obvious that the aperture C may in some cases be formed subsequent to the other steps, or a projecting journal may be cast on or with the wheel A. I, however, prefer the construction shown and described.

For economy of rubber and for perfection and ease of working I prefer to make the tire moderately elastic and about one-eighth of an inch in thickness—rarely exceeding one-fourth of an inch—because with excessive thickness, under a heavy load, the rubber, if too elastic, will "bunch up" in advance of the wheel and greatly impede its progress.

By omitting the side flanges usually employed the rubber may yield laterally to some extent under pressure without being worn into or cut by such flanges. The absence of the flanges also permits of a better result with a given thickness of rubber, since the metallic part of the wheel does not approach so near the floor and under pressure or wear will not so soon come into contact with it. Furthermore, there are no injurious irregularities of the surface B to render the wheels unsightly and objectionable after the rubber is worn away.

I claim as of my invention—

1. As a new article of manufacture, a cylindrical metallic truck-wheel having a homogeneous elastic tire vulcanized thereon, substantially as set forth.

2. A truck-wheel composed of a cylindrical metallic body and a thin homogeneous elastic tire secured thereon by vulcanization, the whole so constructed as to present a smooth cylindrical periphery before and after the yielding tire is worn away, substantially as and for the purposes set forth.

In testimony whereof I affix my signature in presence of two witnesses.

GEO. H. HOOD.

Witnesses:
E. A. PHELPS,
A. H. SPENCER.